United States Patent
Takeuchi et al.

(10) Patent No.: US 12,187,082 B2
(45) Date of Patent: Jan. 7, 2025

(54) TIRE WITH BUILT-IN ANTENNA

(71) Applicant: Nippon Telegraph and Telephone Corporation, Tokyo (JP)

(72) Inventors: Jun Takeuchi, Musashino (JP); Shoji Mochizuki, Musashino (JP); Masayuki Tsuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 303 days.

(21) Appl. No.: 17/913,261

(22) PCT Filed: Apr. 20, 2020

(86) PCT No.: PCT/JP2020/017031
§ 371 (c)(1),
(2) Date: Sep. 21, 2022

(87) PCT Pub. No.: WO2021/214821
PCT Pub. Date: Oct. 28, 2021

(65) Prior Publication Data
US 2023/0150316 A1    May 18, 2023

(51) Int. Cl.
*H01Q 1/22* (2006.01)
*B60C 23/04* (2006.01)
*H01Q 9/04* (2006.01)

(52) U.S. Cl.
CPC ....... *B60C 23/0452* (2013.01); *H01Q 1/2241* (2013.01); *H01Q 9/0407* (2013.01)

(58) Field of Classification Search
CPC .............. B60C 23/0452; B60C 23/064; B60C 23/0486; B60C 19/00; G01V 3/12; G01S 13/885; H01Q 1/2241; H01Q 9/0407
See application file for complete search history.

(56) References Cited

U.S. PATENT DOCUMENTS

| | | | |
|---|---|---|---|
| 10,773,718 B2 * | 9/2020 | Mori | G08G 1/096716 |
| 2003/0154007 A1 * | 8/2003 | Evans | B60T 8/1725 |
| | | | 701/514 |
| 2017/0096036 A1 * | 4/2017 | Guinart | B60C 23/0408 |
| 2017/0254897 A1 * | 9/2017 | Tron | B60C 11/246 |
| 2019/0168549 A1 * | 6/2019 | Kanbayashi | B60T 8/1725 |
| 2021/0124010 A1 * | 4/2021 | Kang | G01S 13/885 |

FOREIGN PATENT DOCUMENTS

| | | | | |
|---|---|---|---|---|
| EP | 3741587 B1 * | 9/2023 | ......... | B60C 23/0415 |
| WO | WO-2011042747 A2 * | 4/2011 | ............... | G01V 3/15 |
| WO | WO-2024151962 A1 * | 7/2024 | | |

OTHER PUBLICATIONS

Geophysical Survey Systems, Inc., *UtilityScan*, literature, Mar. 12, 2020 (reading day), https://www.geophysical.com/products/utilityscan, pp. 1-22.

Airec Engineering Corporation, *I Esper*, literature, Mar. 12, 2020 (reading day), https://www.airec.co.jp/products/espar/iespar.html, pp. 1-3.

\* cited by examiner

*Primary Examiner* — Seokjin Kim
(74) *Attorney, Agent, or Firm* — Workman Nydegger

(57) ABSTRACT

A tire with a built-in antenna includes a radio wave transmissive resin filled in the tire and an antenna arranged in the radio wave transmissive resin, and the antenna transmits a radar wave when an antenna surface of the tire facing a radiation surface of the antenna comes into contact with a ground surface.

17 Claims, 9 Drawing Sheets

TIRE WITH BUILT-IN ANTENNA

TECHNICAL FIELD

The present disclosure relates to a tire with a built-in antenna.

BACKGROUND ART

Ground penetrating radars using electromagnetic waves are used to investigate buried positions of various infrastructure structures buried in the ground, such as for electricity, telecommunications, gas, water (NPLs 1 and 2). A ground penetrating radar emits a radar wave (electromagnetic wave) toward the ground and receives a reflected wave generated when the radar wave collides with an underground buried object, thereby specifying the buried position of the underground buried object.

CITATION LIST

Non Patent Literature

NPL 1: GSSI, "Utility Scan", [online], Internet <URL: https://www.geophysical.com/products/utilityscan>
NPL 2: Airec Technology & Construction Co., Ltd., "i Espar", [online], Internet <URL: https://www.airec-.co.jp/products/espar/iespar.html>

SUMMARY OF THE INVENTION

Technical Problem

A general ground penetrating radar apparatus is installed on a wheeled platform. A radar wave emitted from an antenna of the ground penetrating radar apparatus is incident into the ground through free space propagation.

Since there is a significant difference between the relative permittivity of the air in the free space and the relative permittivity of the ground, most of the radar waves emitted from the antenna are reflected at the boundary of the ground surface, causing an energy loss.

The present disclosure has been made in view of the above circumstance, and an object of the present disclosure is to provide a tire with a built-in antenna for suppressing reflection of a radar wave emitted from an antenna to the ground, and the reflection is generated on a ground surface.

Means for Solving the Problem

To achieve the above object, one aspect of the present disclosure is a tire with a built-in antenna including a radio wave transmissive resin filled in the tire and an antenna arranged in the radio wave transmissive resin. The antenna transmits a radar wave when an antenna surface of the tire facing a radiation surface of the antenna comes into contact with a ground surface.

One aspect of the present disclosure is a tire with a built-in antenna including a transmission tire and a reception tire, and the transmission tire and the reception tire are arranged adjacent to each other in parallel and are filled with a radio wave transmissive resin. The transmission tire includes a transmission antenna arranged in the radio wave transmissive resin, and the transmission antenna transmits a radar wave when an antenna surface of the transmission tire facing a radiation surface of the transmission antenna comes into contact with the ground surface. The reception tire includes a reception antenna arranged in the radio wave transmissive resin, and the reception antenna receives a reflected wave of the radar wave when an antenna surface of the reception tire facing a radiation surface of the reception antenna comes into contact with the ground surface.

Effects of the Invention

The present disclosure allows for providing a tire with a built-in antenna for suppressing reflection of a radar wave emitted from an antenna to the ground, and the reflection is generated on a ground surface.

DESCRIPTION OF EMBODIMENTS

Hereinafter, an embodiment of the present disclosure will be described with reference to the drawings.

First Embodiment

Figure 1:
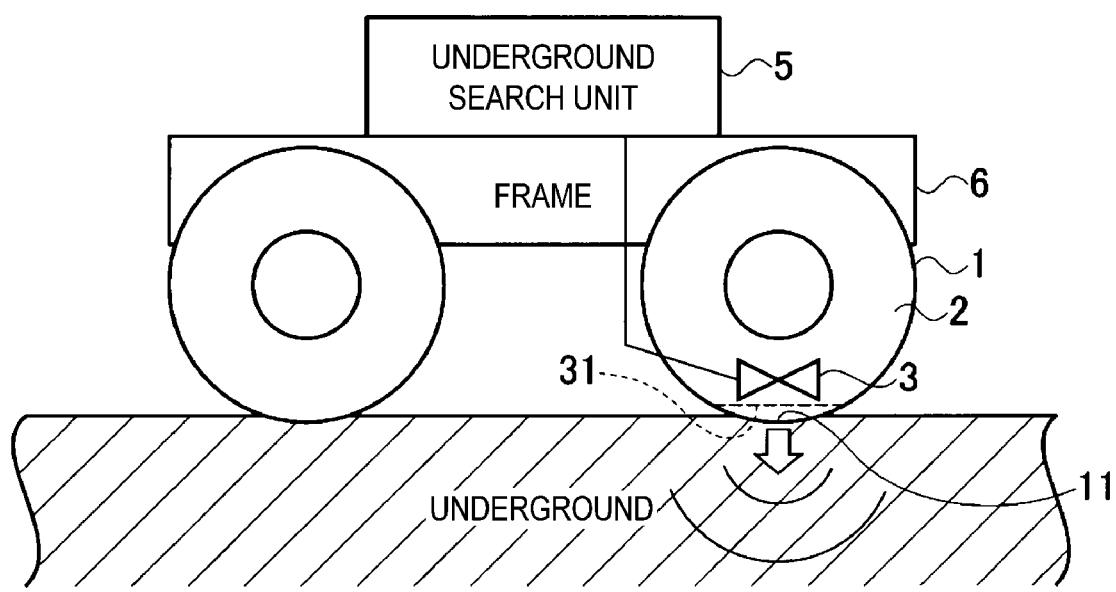
FIG. 1 is a configuration diagram of a ground penetrating radar apparatus according to a first embodiment of the present disclosure.

FIG. 1 is a configuration diagram of a ground penetrating radar apparatus according to a first embodiment. The ground penetrating radar apparatus of the present embodiment has a carriage-type structure in which a tire 1 (wheel) is mounted on a frame 6 (platform). The illustrated ground penetrating radar apparatus includes an underground search unit 5 mounted on the frame 6, and a tire.

At least one of the plurality of tires included in the ground penetrating radar apparatus is the tire 1 (tire with a built-in antenna) in which an antenna is built. The inside of the tire 1 of the present embodiment is filled with a resin 2, and an antenna 3 is arranged in the resin 2.

When an antenna surface 11 of the tire 1 facing (corresponding to) a radiation surface 31 of the antenna 3 comes into contact with the ground surface, the antenna 3 transmits and receives radar waves (electromagnetic waves). Specifically, the antenna 3 receives an instruction from the underground search unit 5 at a timing when the antenna surface 11 of the tire 1 is grounded and emits (transmits) the radar wave toward the ground according to the instruction. Thereafter, the antenna 3 receives a reflected wave (radar wave) generated when the radar wave collides with the underground buried object. The antenna surface 11 of the tire 1 is a part of the surface of the tire 1 in contact with the ground surface, and is a region where radiation from the antenna 3 toward the ground is maximized.

The antenna 3 of the present embodiment spreads on the radiation surface 31, and the antenna 3 is arranged in the tire 1 such that the direction in which the radiation from the antenna is maximized is the ground direction.

The antenna 3 of the present embodiment serves as both a transmission antenna and a reception antenna when the underground search unit 5 switches one antenna 3 at high speed. The antenna 3 of the present embodiment transmits and receives radar waves, but the antenna 3 may be a transmission antenna that only transmits radar waves. In this case, the ground penetrating radar apparatus may separately include a reception antenna that receives a reflected wave of a radar wave. For the antenna 3, either a low-directional antenna or a high-directional antenna may be used.

In the present embodiment, the tire 1 is filled with a radio wave transmissive resin 2, such as polyethylene or Teflon. As the resin 2, a resin having a permittivity closer to the permittivity of the ground than the permittivity of the free space (that is, relative permittivity equals 1) is used. Specifically, the resin 2 is used in which the difference (deviation) between the permittivity of the resin 2 and the permittivity of the ground is smaller than the difference between the permittivity of the free space and the permittivity of the ground. It is preferable to use a resin having a permittivity similar to a general permittivity of the ground as the resin 2. A general permittivity of the ground is, for example, about 10 to 15.

This allows the radar wave emitted from the antenna 3 to propagate through the resin 2 in the tire 1 and reach the ground surface, the reflected wave generated at the boundary between the tire 1 and the ground surface is reduced as compared with the case of propagating in the free space, and a radar wave maintaining more energy (intensity) can be incident on the ground.

Figure 2:
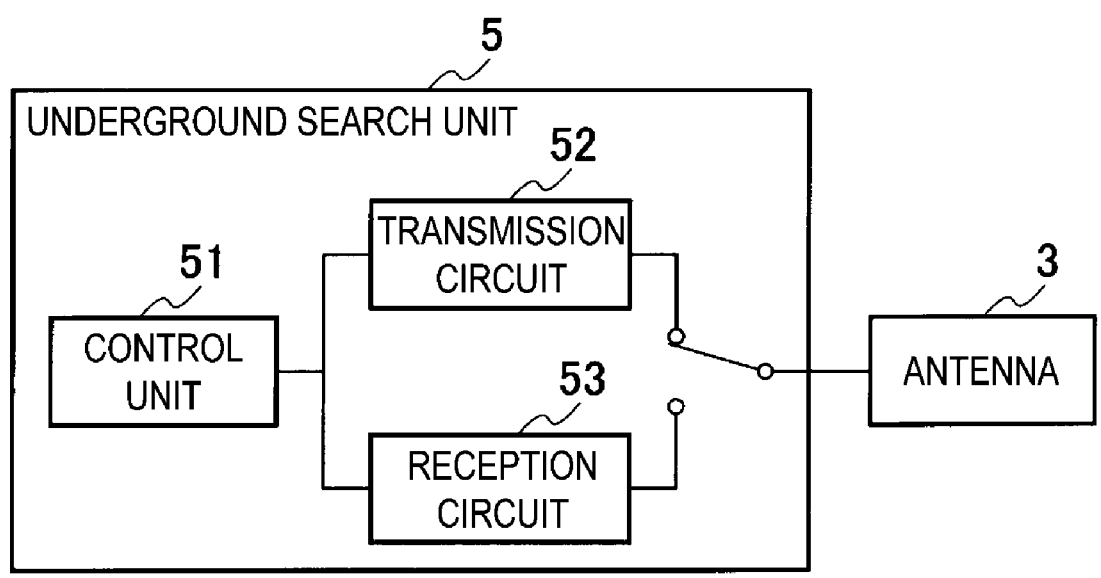
FIG. 2 is a configuration diagram illustrating a configuration of an underground search unit.

FIG. 2 is a configuration diagram illustrating a configuration of the underground search unit 5. The underground search unit 5 uses the antenna 3 to emit a radar wave toward the ground, and receives a reflected wave generated when the radar wave collides with an underground buried object, thereby specifying the buried position of the underground buried object. The underground search unit 5 is connected to the antenna 3 arranged on the tire 1 by a cable or the like.

The illustrated underground search unit 5 includes a control unit 51, a transmission circuit 52, and a reception circuit 53. When detecting that the antenna surface 11 of the tire 1 comes into contact with the ground surface, the control unit 51 instructs the antenna 3 to emit a radar wave via the transmission circuit 52. At this time, the control unit 51 switches a changeover switch of the antenna 3 to the transmission circuit 52 side to connect the transmission circuit 52 and the antenna 3.

Thereafter, the control unit 51 switches the changeover switch of the antenna 3 to the reception circuit 53 side, connects the reception circuit 53 and the antenna 3, and specifies the buried position of the underground buried object using the reflected wave received by the antenna 3.

As a method by which the control unit 51 detects the grounding of the antenna surface 11, for example, a sensor that detects the direction (angle) of the ground contact surface of the tire 1 in conjunction with axle rotation of the tire 1 is installed on an axle of the tire 1. In this case, the control unit 51 receives the orientation of the ground contact surface of the tire 1 from the sensor, determines that the antenna surface 11 of the tire 1 has come into contact with the ground when the orientation of the ground contact surface matches the antenna surface 11, and instructs the antenna 3 to emit a radar wave.

Furthermore, the control unit 51 may install a pressure-sensitive sensor having a mechanism that does not interfere with radar waves on the antenna surface 11 of the tire 1. In this case, when receiving a pressure exceeding a predetermined threshold from the pressure-sensitive sensor, the control unit 51 determines that the antenna surface 11 of the tire 1 is grounded, and instructs the antenna 3 to emit a radar wave.

The transmission circuit 52 includes, for example, a pulse generator, an amplifier, a filter, and the like (not illustrated). The pulse generator generates a transmission pulse wave on the basis of an instruction from the control unit 51. The transmission pulse wave is amplified by an amplifier, frequency-adjusted by a filter, and input to the antenna 3. As a result, the antenna 3 emits radar waves toward the ground.

The reception circuit 53 includes, for example, a sampling circuit, an amplifier, a filter, and the like (not illustrated). The radar wave (reflected wave) received by the antenna 3 is frequency-adjusted by a filter, amplified by an amplifier, A/D converted by a sampling circuit, and input to the control unit 51.

In the tire 1 (tire with a built-in antenna) of the first embodiment described above, the radio wave transmissive resin 2 is filled in the inside of the tire 1, the tire 1 includes the antenna 3 arranged in the radio wave transmissive resin 2, and the antenna 3 transmits a radar wave when the antenna surface 11 of the tire facing the radiation surface 31 of the antenna 3 comes into contact with the ground surface.

In the present embodiment, the radar wave emitted from the antenna 3 propagates through the resin 2 in the tire 1 and is incident on the ground surface. As a result, the reflected wave generated at the boundary between the tire 1 and the ground surface is reduced as compared with the case where the reflected wave propagates in the free space and is incident on the ground, so that the radar wave having more energy (intensity) can be incident on the ground. Therefore, in the ground penetrating radar apparatus of the present embodiment, it is possible to perform a more sensitive underground buried object search.

Figure 3:
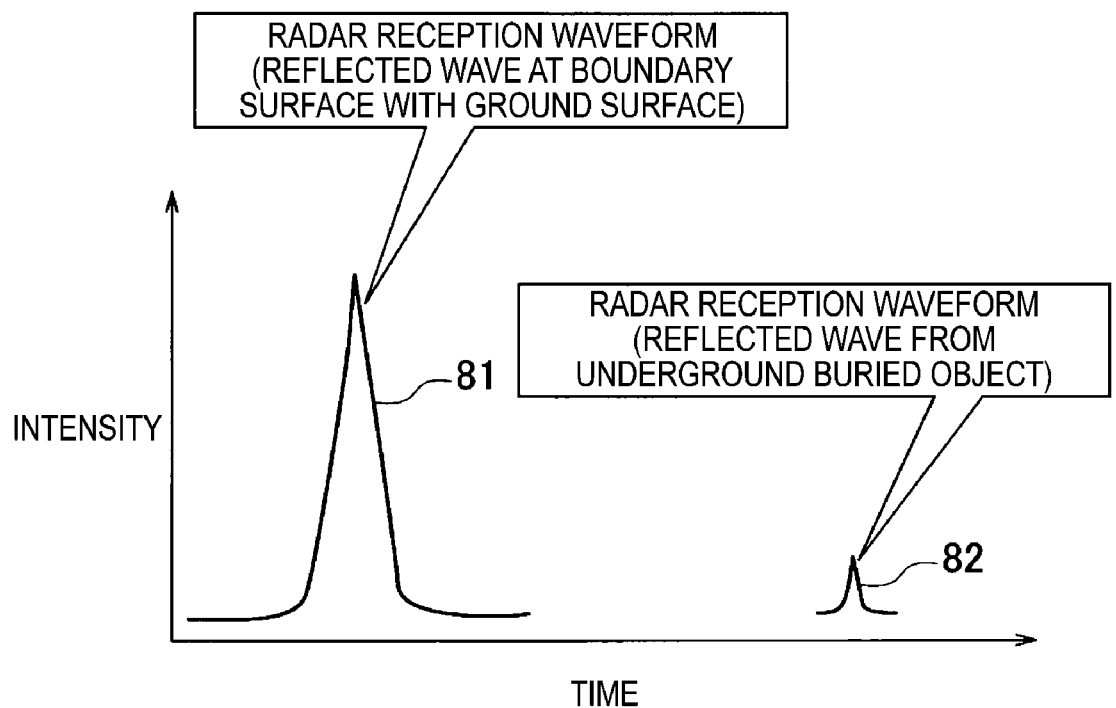
FIG. 3 is a graph illustrating a radar reception waveform of a reflected wave in a comparative example.
Figure 4:
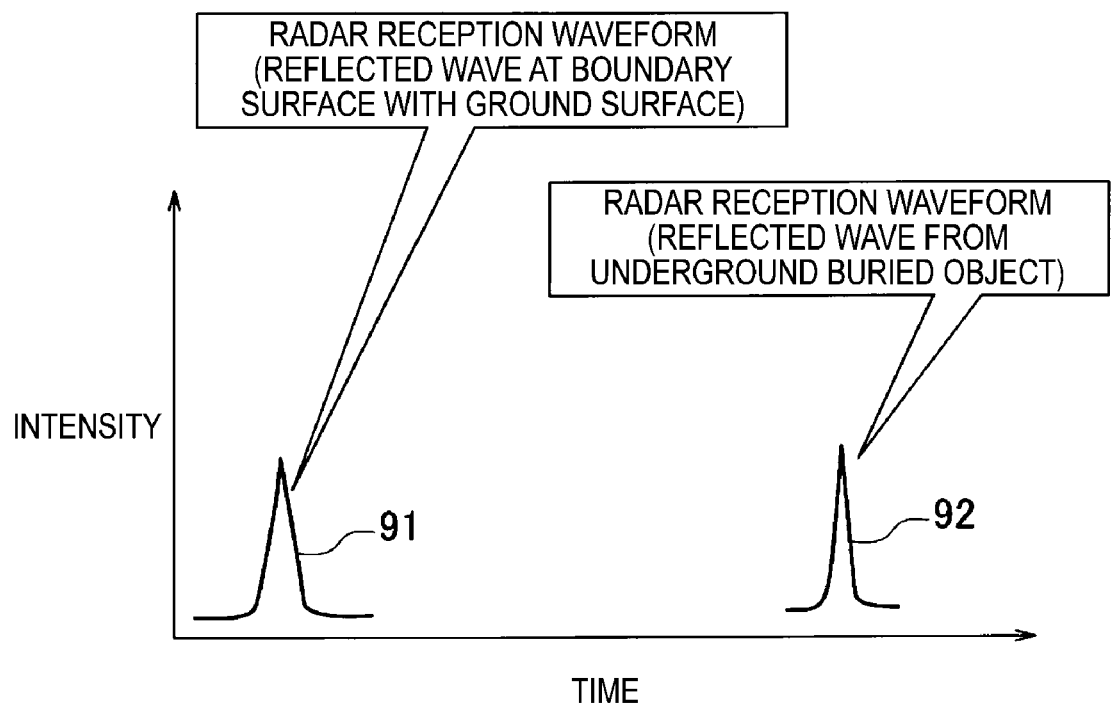
FIG. 4 is a graph illustrating a radar reception waveform of a reflected wave in the first embodiment.

FIGS. 3 and 4 are graphs illustrating a radar reception waveform of a reflected wave generated at a boundary surface with the ground surface and a radar reception waveform of a reflected wave from an underground buried object. FIG. 3 is a graph illustrating a radar reception waveform of a comparative example in which the antenna is mounted on the underground search unit 5 or the frame 6 of FIG. 1. In this case, the radar wave emitted by the antenna propagates through the free space and is incident on the ground. Since there is a large difference between the relative permittivity of the air in the free space and the relative permittivity of the ground, most of the radar waves emitted from the antenna are reflected at the boundary of the ground surface, which causes an energy loss of the radar waves. That is, reflected wave 81 having unnecessary large energy is generated at the boundary surface with the ground surface. Therefore, the energy of the radar wave incident on the ground decreases, the energy of the reflected wave 82 from the underground buried object also decreases, and the sensitivity (searching ability) of the radar decreases.

FIG. 4 is a graph illustrating a radar reception waveform of a reflected wave of the present embodiment. In the present embodiment, the radar wave emitted from the antenna 3 propagates through the resin 2 in the tire 1 and is incident on the ground surface. As a result, the energy of an unnecessary reflected wave 91 generated at the boundary surface with the ground is reduced, and the energy of the radar wave incident on the ground is increased as compared with the comparative example illustrated in FIG. 3. As the energy of the radar wave incident on the ground increases, the energy of the reflected wave 92 from the underground buried object also increases, and the sensitivity of the radar can be improved.

Second Embodiment

Figure 5:
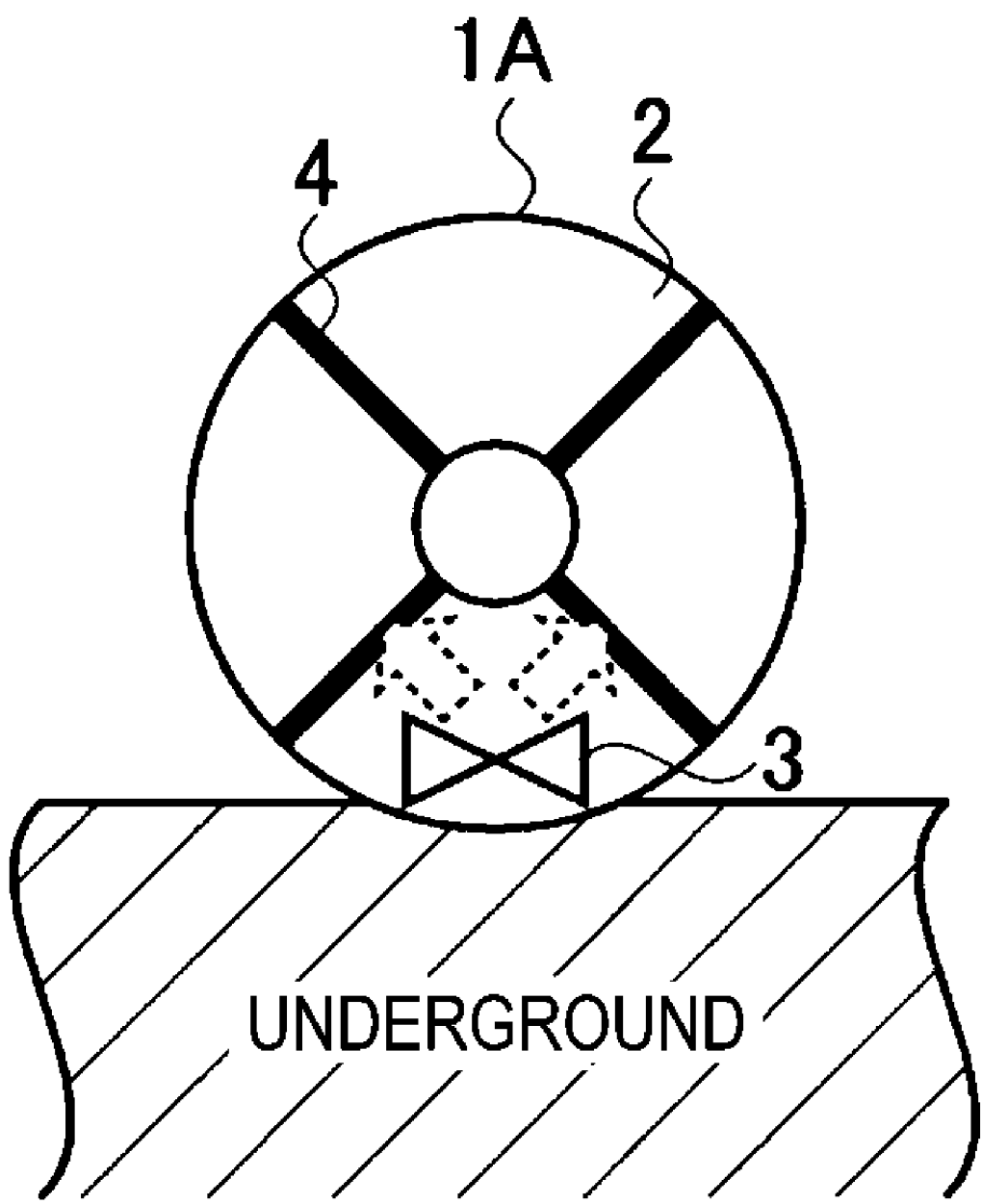
FIG. 5 is a diagram schematically illustrating a tire with a built-in antenna according to a second embodiment of the present disclosure.

FIG. 5 is a diagram illustrating a tire with a built-in antenna according to a second embodiment. A tire 1A of the present embodiment is used in a ground penetrating radar apparatus as illustrated in FIG. 1.

The illustrated tire 1A includes a metal spoke 4 in the tire 1 illustrated in FIG. 1. The spoke 4 is a rod connecting a hub (center) and a rim (outer peripheral portion) of the tire 1A.

Since the tire 1A of the present embodiment includes the metal spoke 4, the rigidity of the tire 1A can be improved, and the radar wave emitted from the antenna 3 can be prevented from propagating to the inside of the tire 1A. As a result, the energy of the radar wave incident on the ground can be increased.

Third Embodiment

Figure 6:
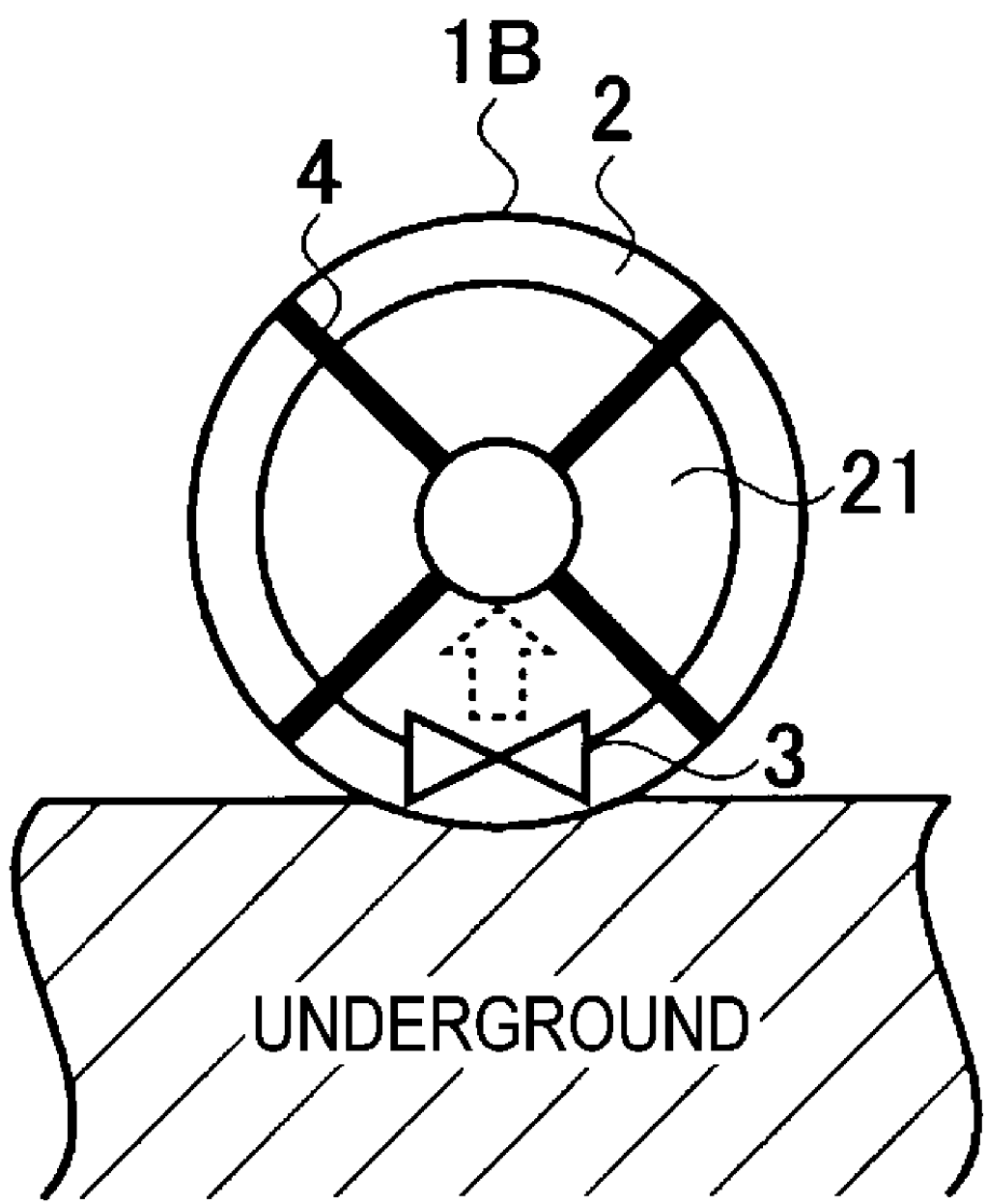
FIG. 6 is a diagram schematically illustrating a tire with a built-in antenna according to a third embodiment of the present disclosure.

FIG. 6 is a diagram illustrating a tire with a built-in antenna according to a third embodiment. A tire 1B of the present embodiment is used in a ground penetrating radar apparatus as illustrated in FIG. 1.

A tire 1C of the present embodiment is filled with two types of resins. That is, the outer side of the inside of the tire 1C is filled with the radio wave transmissive resin 2, and the inner side of the inside of the tire 1C is filled with the radio wave absorbing resin 21. The antenna 3 similar to that of the first embodiment is arranged at a boundary between the radio wave transmissive resin 2 and the radio wave absorbing resin 21 or in the radio wave transmissive resin 2. The radio wave absorbing resin 21 is, for example, rubber containing carbon powder or ferrite powder, urethane foam, epoxy resin, or the like. The radio wave transmissive resin 2 is, for example, polyethylene or Teflon.

As a result, in the present embodiment, it is possible to attenuate the radar wave in the tire inside (center) direction. Since the radar wave in the tire inside direction is an unnecessary radar wave that does not propagate into the ground and causes noise, the radar wave is attenuated to reduce the influence of noise. The illustrated tire 1C includes the spoke 4 of the second embodiment, but may not include the spoke 4.

Fourth Embodiment

Figure 7:
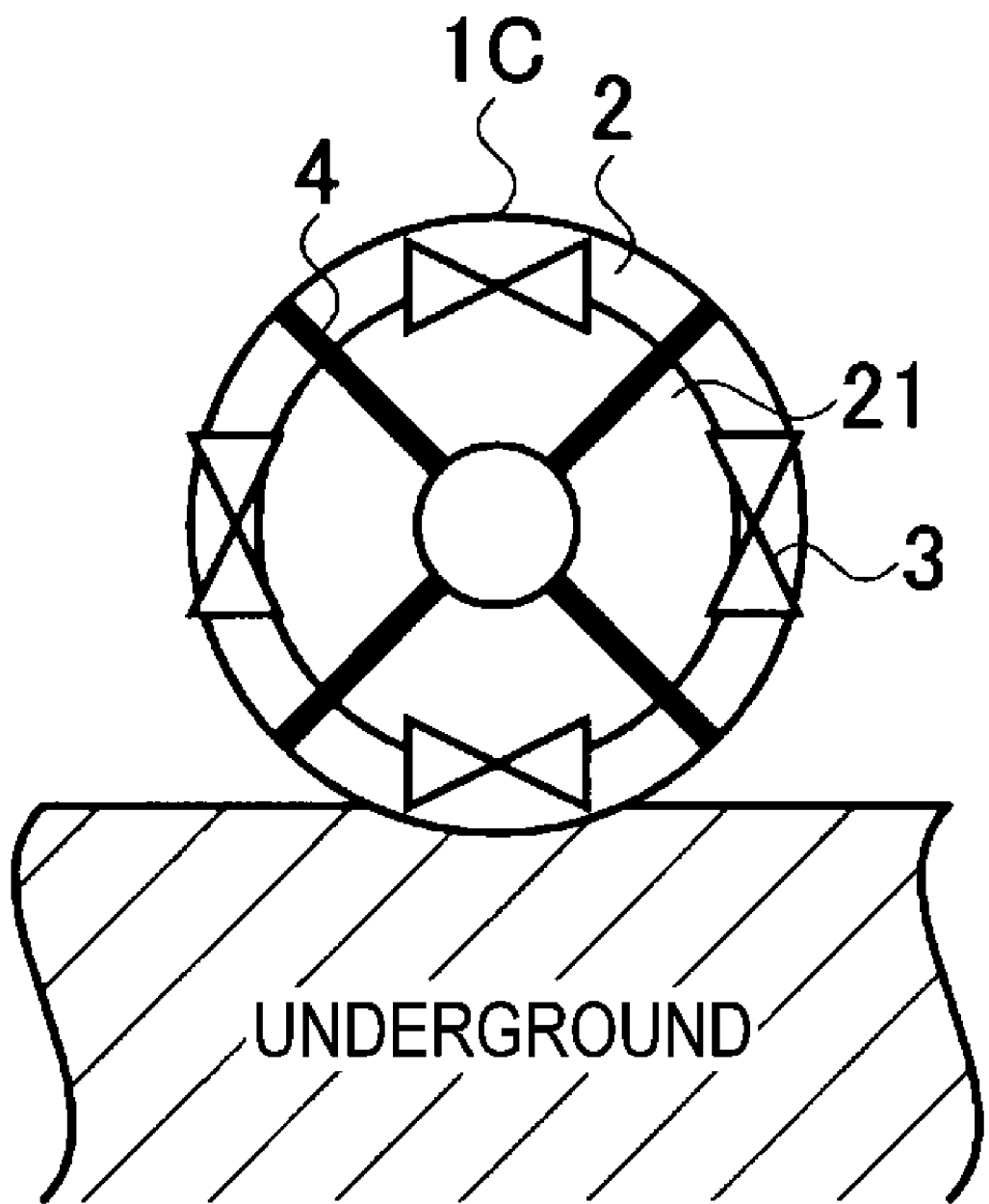
FIG. 7 is a diagram schematically illustrating a tire with a built-in antenna according to a fourth embodiment of the present disclosure.

FIG. 7 is a diagram illustrating a tire with a built-in antenna according to a fourth embodiment. A tire 1C of the present embodiment is used in a ground penetrating radar apparatus as illustrated in FIG. 1.

The tire 1C of the present embodiment includes a plurality of antennas 3. In the illustrated example, the tire 1D includes four antennas, but the number of antennas is not limited thereto. The antenna 3 is similar to the antenna 3 illustrated in FIG. 1.

As illustrated in FIG. 1, when one antenna is built in one tire, only one radar wave can be emitted every time the tire 1 makes one rotation. On the other hand, in a case where a plurality of antennas 3 are built in one tire 1C, a radar wave is transmitted and received every time the antenna surface 11 of each antenna 3 comes into contact with the ground surface. Therefore, a plurality of times of reflected waves are input to the control unit 51 of the underground search unit 5 while the tire 1C makes one rotation, and the search pitch is increased. As a result, the control unit 51 can improve the resolution of the radar.

The illustrated tire 1C includes the spoke 4 of the second embodiment, and is filled with two types of resins 2, 21 of the third embodiment. However, the tire 1C of the present embodiment may not include the spoke 4, or may be filled with only the radio wave transmissive resin 2.

Fifth Embodiment

Figure 8:
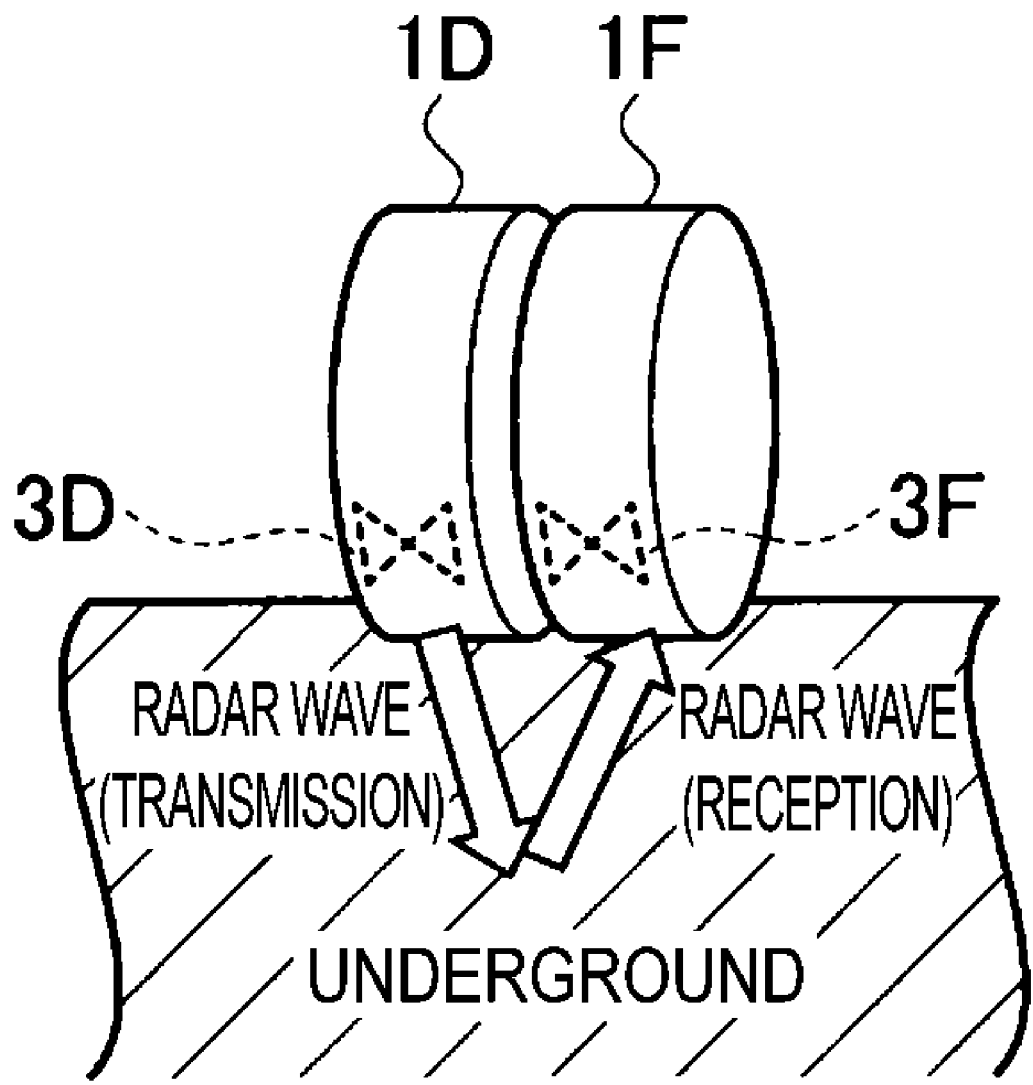
FIG. 8 is a diagram schematically illustrating a tire with a built-in antenna according to a fifth embodiment of the present disclosure.

FIG. 8 is a diagram illustrating a tire with a built-in antenna according to a fifth embodiment. Tires 1D, 1F of the present embodiment is used in a ground penetrating radar apparatus as illustrated in FIG. 1.

The tire of the present embodiment includes a transmission tire 1D and a reception tire 1F, and these tires 1D, 1F are arranged adjacent to each other in parallel and mounted on the ground penetrating radar apparatus. The transmission tire 1D includes a transmission antenna 3D arranged in a radio wave transmissive resin 2. When an antenna surface 11 of the transmission tire 1D facing a radiation surface 31 of the transmission antenna 3D comes into contact with the ground surface, the transmission antenna 3D transmits a radar wave. The reception tire 1F includes a reception antenna 3F arranged in the radio wave transmissive resin 2. When an antenna surface 11 of the reception tire 1F facing a radiation surface 31 of the reception antenna 3F comes into contact with the ground surface, the reception antenna 3F receives a reflected wave of the radar wave transmitted by the transmission antenna 3D.

The antenna surface 11 of the transmission tire 1D and the antenna surface 11 of the reception tire 1F are set so as to be in contact with the ground surface at the same timing. For example, by fixing the transmission tire 1D and the reception tire 1F to the same axle and arranging the transmission tire 1D and the reception tire 1F adjacent to each other in parallel, the antenna surfaces 11 of the tires 1D, 1F can be simultaneously installed. As a result, the reception antenna 3F can receive the reflected wave of the radar wave transmitted by the transmission antenna 3D.

When one antenna 3 performs both transmission and reception as in the antennas 3 of the first to fourth embodiments, high-speed switching processing occurs in the control unit 51. Specifically, the control unit 51 needs to switch the connection destination of the antenna 3 to the transmission circuit 52 or the reception circuit 53 at high speed.

On the other hand, in the present embodiment, since the transmission antenna 3D and the reception antenna 3F are provided, high-speed switching processing by the control unit 51 becomes unnecessary. That is, the underground search unit of the present embodiment is different from the underground search unit 5 illustrated in FIG. 2 in that the antenna changeover switch is not provided, the transmission antenna 3D of the transmission tire 1D is connected to the transmission circuit 52, and the reception antenna 3F of the reception tire 1F is connected to the reception circuit 53.

The transmission tire 1D and the reception tire 1F of the present embodiment may be applied to any one of the first to fourth tires 1, 1A, 1B, 1C.

Hardware Configuration

Figure 9:
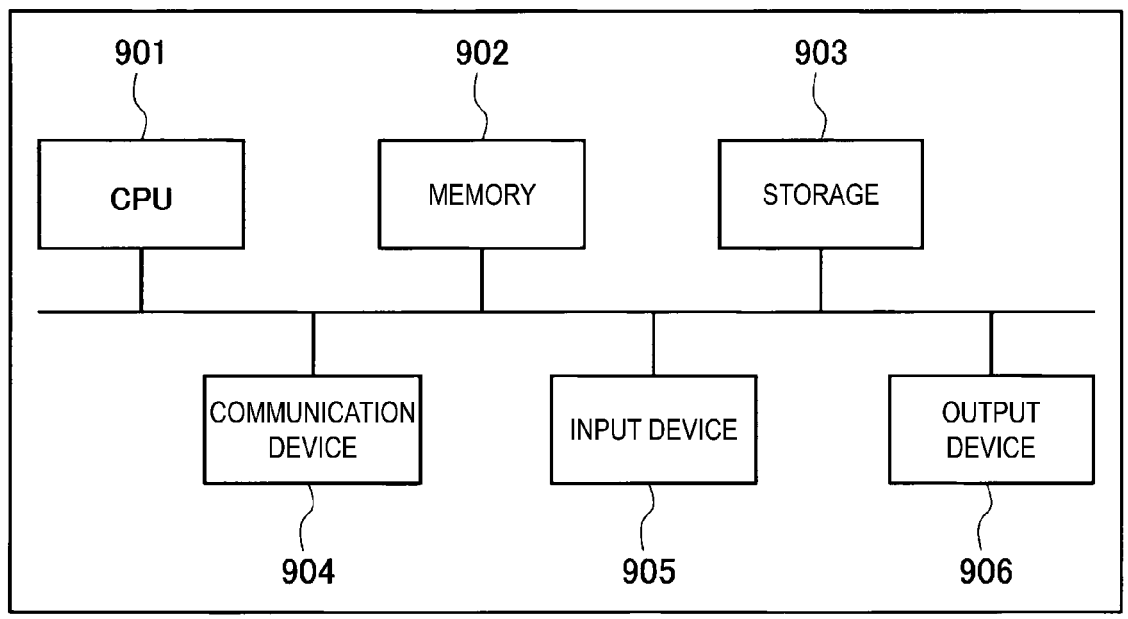
FIG. 9 is a hardware configuration example.

As the control unit 51 described above, for example, a general-purpose computer system as illustrated in FIG. 9 can be used. The illustrated computer system includes a central processing unit (CPU, processor) 901, a memory 902, a storage 903 (hard disk drive: HDD, solid state drive: SSD), a communication device 904, an input device 905, and an output device 906. The memory 902 and the storage 903 are storage devices. In the computer system, each function of the control unit 51 is implemented by the CPU 901 executing a predetermined program loaded on the memory 902.

The control unit 51 may be implemented on one computer or may be implemented on a plurality of computers. Also, the control unit 51 may be a virtual machine implemented on a computer. The program for the control unit 51 may be stored in a computer-readable recording medium such as a HDD, a SSD, a universal serial bus (USB) memory, a compact disc (CD), or a digital versatile disc (DVD) or may be distributed via a network.

The present disclosure is not limited to the above-described embodiment and modifications, and various modifications may be made within the scope of the gist of the present disclosure. For example, the tire with a built-in antennas of the first to fifth embodiments may be arbitrarily combined.

REFERENCE SIGNS LIST 1, 1A, 1B, 1C Tire with a built-in antenna
1D Transmission tire with a built-in antenna
1F Reception tire with a built-in antenna
2 Radio wave transmissive resin
21 Radio wave absorbing resin
3 Antenna
3D Transmission antenna
3F Reception antenna
4 Spoke

The invention claimed is:

1. A tire with a built-in antenna, comprising:
a radio wave transmissive resin filled in the tire; and
an antenna arranged in the radio wave transmissive resin, wherein
the antenna transmits a radar wave when an antenna surface of the tire facing a radiation surface of the antenna comes into contact with a ground surface.

2. The tire with a built-in antenna according to claim 1, wherein the antenna receives a reflected wave of the radar wave when the antenna surface comes into contact with the ground surface.

3. The tire with a built-in antenna according to claim 1, wherein the tire comprises a metal spoke.

4. The tire with a built-in antenna according to claim 1, wherein
the radio wave transmissive resin is filled in an outer region of an interior of the tire, and a radio wave absorbing resin is filled in an inner region of the interior of the tire, and
the antenna is arranged at a boundary between the radio wave transmissive resin and the radio wave absorbing resin or in the radio wave transmissive resin.

5. The tire with a built-in antenna according to claim 1, comprising:
a plurality of the antennas, wherein
each of the plurality of the antennas transmits a radar wave when an antenna surface of the tire facing a radiation surface of the antenna comes into contact with the ground surface.

6. The tire with a built-in antenna according to claim 1, wherein the tire is used for a ground penetrating radar apparatus.

7. A tire with a built-in antenna, comprising
a transmission tire and a reception tire, wherein
the transmission tire and the reception tire are arranged adjacent to each other in parallel and are filled with a radio wave transmissive resin,
the transmission tire includes
a transmission antenna arranged in the radio wave transmissive resin,
the transmission antenna transmits a radar wave when an antenna surface of the transmission tire facing a radiation surface of the transmission antenna comes into contact with a ground surface,
the reception tire includes
a reception antenna arranged in the radio wave transmissive resin, and
the reception antenna receives a reflected wave of the radar wave when an antenna surface of the reception tire facing a radiation surface of the reception antenna comes into contact with the ground surface.

8. The tire with a built-in antenna according to claim 2, wherein the tire comprises a metal spoke.

9. The tire with a built-in antenna according to claim 2, wherein
the radio wave transmissive resin is filled in an outer region of an interior of the tire, and a radio wave absorbing resin is filled in an inner region of the interior of the tire, and
the antenna is arranged at a boundary between the radio wave transmissive resin and the radio wave absorbing resin or in the radio wave transmissive resin.

10. The tire with a built-in antenna according to claim 3, wherein
the radio wave transmissive resin is filled in an outer region of an interior of the tire, and a radio wave absorbing resin is filled in an inner region of the interior of the tire, and
the antenna is arranged at a boundary between the radio wave transmissive resin and the radio wave absorbing resin or in the radio wave transmissive resin.

11. The tire with a built-in antenna according to claim 2, comprising:
a plurality of the antennas, wherein
each of the plurality of the antennas transmits a radar wave when an antenna surface of the tire facing a radiation surface of the antenna comes into contact with the ground surface.

12. The tire with a built-in antenna according to claim 3, comprising:
a plurality of the antennas, wherein
each of the plurality of the antennas transmits a radar wave when an antenna surface of the tire facing a radiation surface of the antenna comes into contact with the ground surface.

13. The tire with a built-in antenna according to claim 4, comprising:
a plurality of the antennas, wherein
each of the plurality of the antennas transmits a radar wave when an antenna surface of the tire facing a radiation surface of the antenna comes into contact with the ground surface.

14. The tire with a built-in antenna according to claim 2, wherein the tire is used for a ground penetrating radar apparatus.

15. The tire with a built-in antenna according to claim 3, wherein the tire is used for a ground penetrating radar apparatus.

16. The tire with a built-in antenna according to claim 4, wherein the tire is used for a ground penetrating radar apparatus.

17. The tire with a built-in antenna according to claim 5, wherein the tire is used for a ground penetrating radar apparatus.

\* \* \* \* \*